United States Patent
Galligan et al.

(10) Patent No.: US 7,462,339 B2
(45) Date of Patent: Dec. 9, 2008

(54) METALLIC FOAM TRAP FOR POISONS: AIRCRAFT OZONE

(75) Inventors: Michael Patrick Galligan, Cranford, NJ (US); Rudolph H. Lechelt, Edison, NJ (US)

(73) Assignee: BASF Catalysts LLC, Iselin, NJ (US)

( * ) Notice: Subject to any disclaimer, the term of this patent is extended or adjusted under 35 U.S.C. 154(b) by 385 days.

(21) Appl. No.: 11/321,254

(22) Filed: Dec. 29, 2005

(65) Prior Publication Data

US 2007/0154375 A1    Jul. 5, 2007

(51) Int. Cl.
A62B 23/00 (2006.01)
B01D 53/00 (2006.01)
B01J 15/00 (2006.01)

(52) U.S. Cl. ............... 423/219; 423/245.1; 423/245.3; 422/120; 422/122; 422/168; 422/169; 422/170; 422/171; 422/177; 422/180; 422/181; 422/188; 422/190; 422/211

(58) Field of Classification Search ............... 423/219, 423/245.1, 245.3; 422/168, 169, 170, 171, 422/177, 180, 181, 188, 190, 211, 120, 122
See application file for complete search history.

(56) References Cited

U.S. PATENT DOCUMENTS

| | | | |
|---|---|---|---|
| 3,111,396 | A | 11/1963 | Ball |
| 3,269,801 | A | 8/1966 | Boberg et al. |
| 3,972,979 | A | 8/1976 | Kageyama |
| 4,027,367 | A | 6/1977 | Rondeau |
| 4,053,557 | A | 10/1977 | Kageyama |
| 4,059,675 | A | 11/1977 | Yang et al. |
| 4,059,676 | A | 11/1977 | Yang et al. |
| 4,059,683 | A | 11/1977 | Lindberg et al. |
| 4,206,083 | A | 6/1980 | Chang |
| 4,261,863 | A * | 4/1981 | Kent et al. ............ 502/324 |
| 4,302,490 | A | 11/1981 | Byrd |
| 4,343,776 | A | 8/1982 | Carr et al. |
| 4,405,507 | A | 9/1983 | Carr et al. |
| 4,461,155 | A | 7/1984 | Werjefelt |
| 4,665,973 | A | 5/1987 | Limberg et al. |
| 4,900,712 | A | 2/1990 | Bar-Ilan et al. |
| 5,080,882 | A | 1/1992 | Yoshimoto et al. |
| 5,187,137 | A | 2/1993 | Terui et al. |
| 5,283,041 | A | 2/1994 | Nguyen et al. |

(Continued)

OTHER PUBLICATIONS

U.S. Appl. No. 11/316,594, "Exhaust Inlet Metallic Foam Trap Coupled to a Downstream Monolithic Precious Metal Catalyst", Galligan et al., filed Dec. 22, 2005.

(Continued)

*Primary Examiner*—Timothy C Vanoy
(74) *Attorney, Agent, or Firm*—Melanie L. Brown; Bronwen M. Loeb; Drinker Biddle (57) ABSTRACT

The present invention is directed to an improved apparatus and method of minimizing catalyst poisoning by inorganic deposits from lube oil additives and particulate matter, especially in aircraft. More specifically, the present invention is directed to an air purification system comprising an upstream metallic foam trap and downstream converter, wherein the trap physically blocks inorganic deposits and particulate matter from poisoning the downstream catalysts. The present invention is also directed to a metallic foam trap containing a coat comprising a first metallic thermal arc sprayed layer and optionally a second refractory metal oxide.

20 Claims, 2 Drawing Sheets

U.S. PATENT DOCUMENTS

| | | | |
|---|---|---|---|
| 5,422,331 | A | 6/1995 | Galligan et al. |
| 5,578,283 | A | 11/1996 | Chen et al. |
| 5,620,672 | A | 4/1997 | Galligan et al. |
| 5,643,545 | A | 7/1997 | Chen et al. |
| 5,653,949 | A | 8/1997 | Chen et al. |
| 5,721,188 | A | 2/1998 | Sung et al. |
| 5,891,402 | A | 4/1999 | Sassa et al. |
| 5,951,957 | A | 9/1999 | Simpson |
| 6,007,781 | A * | 12/1999 | Campbell et al. ............ 422/122 |
| 6,096,277 | A * | 8/2000 | Campbell et al. ............ 423/219 |
| 6,214,303 | B1 | 4/2001 | Hoke et al. |
| 6,277,347 | B1 | 8/2001 | Stearns et al. |
| 6,319,484 | B1 | 11/2001 | Shore et al. |
| 6,576,199 | B1 | 6/2003 | Lui et al. |
| 6,616,903 | B2 | 9/2003 | Poles et al. |
| 6,810,660 | B2 | 11/2004 | Hepburn et al. |
| 6,843,835 | B2 | 1/2005 | Fornai et al. |
| 2001/0027165 | A1 | 10/2001 | Galligan et al. |
| 2002/0128151 | A1 | 9/2002 | Galligan et al. |
| 2003/0165414 | A1 | 9/2003 | Galligan et al. |
| 2004/0009106 | A1 | 1/2004 | Galligan et al. |
| 2004/0020359 | A1 | 2/2004 | Koemer et al. |
| 2004/0038819 | A1 | 2/2004 | Galligan et al. |
| 2004/0087439 | A1 | 5/2004 | Hwang et al. |
| 2004/0219075 | A1* | 11/2004 | Hepburn et al. ............. 422/171 |
| 2005/0163677 | A1 | 7/2005 | Galligan et al. |

OTHER PUBLICATIONS

U.S. Appl. No. 11/050,383, "Deflector Plate to Enhance Fluid Stream Contract with a Catalyst", Galligan, Michael, filed Feb. 3, 2005.

U.S. Appl. No. 11/316,094, "Inlet Metallic Foam Support Coupled to Precious Metal Catalyst for Application on 4 Stroke Platform", Galligan, Michael, filed Dec. 22, 2005.

Arun D. Jatkar, "A New Catalyst Support Structure for Automotive Catalytic Converters", SAE Technical Paper 971032, Congress and Exposition, Detroit, Michigan, Feb. 24-27, 1997.

Pizzirusso, Joseph F., "The Unique Properties of Polyurethane Foam for Small Engine Filters", SAE 951811, Sep. 13-15, 1995.

Poon, et al., "Fractional Efficiency and Particle Mass Loading Characteristics of Engine Air Filters", SAE 970673, Feb. 24-27, 1997.

Stankiewicz, et al., Properties and Performance of UltraCat(TM) Open-Cell Silicon Carbide Foam Catalyst Substrates, SAE 980669, Feb. 23-26, 1998.

Storey, et al., "Analysis of Semivolatile Organic Compounds in Diesel Exhaust Using a Novel Sorption and Extraction Method", SAE 1999-01-3534, Oct. 25-28, 1999.

Nelson, et al., "Reduction in Emissions and Noise from a 500 cc Snowmobile", SAE 2000-01-2575, Sep. 11-13, 2000.

Zhi, et al., "Development and Experimental Study of a New Diesel Exhaust Particulate Trap System", SAE 2000-01-2846, Oct. 16-19, 2000.

Van Setten, et al., "Molten Salts Supported on Ceramic Foam in the Potential Application of Diesel Soot Abatement Technology", SAE 2001-01-0905, Mar. 5-8, 2001.

Boretto, et al., "Diesel Particulate Filter Based on Ceramic Foams", CNR 1999-24-0052, 4th International Conference on Internal Combustion Engines: Experiments and Modeling, Capri, Naples, Italy, Sep. 12-16, 1999.

* cited by examiner

METALLIC FOAM TRAP FOR POISONS: AIRCRAFT OZONE

FIELD OF THE INVENTION

The present invention relates generally to an apparatus and method for the improvement of air quality. More specifically, the present invention relates to an apparatus and method for improved abatement of ozone and volatile organic compounds (VOCs) from air, particularly from aircraft cabin air.

BACKGROUND OF THE INVENTION

A commercial aircraft usually includes an environmental control system for providing a stream of cooled, conditioned air to an aircraft cabin. A typical environmental control system receives compressed air such as bleed air from a compressor stage of an aircraft gas turbine engine, expands the compressed air in a cooling turbine and removes moisture from the compressed air via a water extractor.

Toxic ozone in the compressed air becomes an issue when an aircraft is cruising at altitudes that exceed 20,000 feet. To reduce the ozone to a level within satisfactory limits, the environmental system is provided with an ozone-destroying catalytic converter.

There are a number of desirable characteristics for an ozone-destroying catalytic converter of an aircraft. These characteristics include a) high efficiency of ozone conversion at bleed air operating temperature; b) good poison resistance from humidity, sulfur compounds, oil, dust, and the like, which may be present in the compressed air (for long life and minimum system overhaul and maintenance costs); c) light weight to minimize system parasitic load; d) high structural integrity of catalyst support under extreme heat and/or vibration shock, which may arise during normal flight conditions (also for long life and minimum system overhaul and maintenance costs); and e) high mass transport efficiency with low pressure drop.

Among the various ways known to eliminate ozone contamination from an air stream by decomposition of the ozone into oxygen are catalytic substances including metallic and non-metallic catalysts. Although catalytic systems appear to be the most efficient way to remove ozone from the bleed air or pneumatic ducting air supply system of an aircraft, many of such catalytic substances e.g. in the form of pellets or particles, must be carried in a container or canister, which creates problems with regard to weight as well as affecting the air flow. These materials also have other disadvantages. Thus, for example, the use of a catalyst coating on a metal substrate is sacrificial, in that the resultant catalyst coated oxide is readily removed and lost in the air stream. Although nickel is satisfactory it requires a very clean surface for deposition of the metal.

Many systems are known in the art for the removal of ozone from air, including those disclosed in the following U.S. patents. U.S. Pat. No. 5,422,331, incorporated herein by reference, discloses methods and catalyst compositions for abating noxious substances, particularly ozone, contained in air. The treatment of carbon monoxide, hydrogen sulfide and hydrocarbons is also discussed. A primary focus of this patent is methods of treating air taken into and/or circulated in aircraft cabins, with the cabins of trains, buses and other vehicles being mentioned as well. The patent also indicates that the disclosed catalysts can be used to abate ozone in equipment, such as xerographic copy machines, which generate ozone. Further, the patent indicates that the catalysts can be applied to surfaces in air handling systems for residences, office and factory buildings, public buildings, hospitals and the like. For this method, the catalyst can be applied to existing substrates of the air handling system, such as fan blades in air handling fans or compressors, grills, louvers or any other surface exposed to the air stream.

U.S. Pat. No. 4,206,083, incorporated herein by reference, discloses the co-precipitation of platinum, palladium and manganese oxide on a ceramic support, such as a cordierite support, in order to provide a catalyst suitable for the reduction of ozone content of air intended for human respiration. The patent refers to U.S. Pat. No. 3,269,801 as evidence that it had been long recognized that ozone is present in the atmosphere in toxic concentrations at high altitudes. Aircraft flying at those altitudes scoop in cabin air from the outside atmosphere which, because it is very much compressed, is raised in temperature to several hundred degrees centigrade. Such air is treated to reduce the ozone concentration of it to below 1 part per million ("ppm") to render it fit for use as cabin air.

U.S. Pat. No. 5,187,137, incorporated herein by reference, discloses an ozone abatement catalyst comprising a composition containing manganese oxide and metallic palladium and/or palladium oxide as the essential ingredients, formed as a thin film on a support. The method of preparing the catalyst includes coating on a support a slurry containing manganese oxide, metallic palladium and/or a palladium compound, and an inorganic oxide sol as a binder, for example, an alumina sol, silica sol, titania sol or zirconia sol. The patent discloses that the support, i.e., the substrate on which the catalytic material is disposed, may be a cordierite or other similar inorganic support, or it may be a metal support.

U.S. Pat. No. 4,900,712, incorporated herein by reference, discloses a catalytic washcoat in which one or more catalytically active non-noble metal oxides ("dopants") such as iron oxide are deposited from neutral aqueous colloidal solutions thereof onto preformed high surface area crystalline alumina. The neutral colloidal compounds are said to provide a uniform, thin coating of the non-noble dopants on the alumina particles and to avoid the use of noxious elements such as nitrates or chlorides, thereby substantially eliminating any air pollution hazard. The reference to eliminating air pollution hazards appears to be with reference to the manufacture of the catalyst.

U.S. Pat. No. 4,343,776, incorporated herein by reference, discloses an ozone abatement catalyst containing at least one platinum group metal (platinum, palladium or rhodium) or catalytically active compound thereof and an oxide or aluminate of at least one non-precious Group VIII metal (iron, cobalt or nickel). By applying the non-precious metal oxide as an alumina slip prior to application of the platinum group metal component to the substrate, the platinum group metal, e.g., palladium, is preferentially exposed to the ozone. The carrier or support, i.e., the substrate, may be any one of a wide range of materials, including aluminum.

U.S. Pat. No. 5,250,489, incorporated herein by reference, discloses a catalyst structure configured to provide heat exchange in which the support, i.e., substrate, is a metallic support which may comprise aluminum or aluminum alloys, provided the latter are used at temperatures which will not deform or melt the material. However, other materials, including aluminum-containing steels are described.

U.S. Pat. No. 5,080,882, incorporated herein by reference, discloses an ozone decomposition catalyst disposed on a thin porous carrier (substrate) material which has micropores of preferably not less than 30 microns in diameter for ozone abatement, in order to prevent substantial pressure loss. Any suitable known ozone catalyst may be utilized, including oxides of manganese, iron, silver, nickel or copper and a noble metal such as platinum or palladium or a mixture of two or more of these.

In addition to the problems caused by elevated levels of ozone in aircraft air, high levels of volatile organic compounds (VOCs) can also cause substantial passenger discomfort. The treatment of aircraft intake gases containing VOCs has been of increasing concern in recent years. Catalytic oxidation and adsorption are commonly used for removing these pollutants. In some instances, adsorption by adsorbents such as carbon can be used; however, this process does not destroy the pollutants, but merely concentrates them. Furthermore, adsorption efficiency can be adversely impacted by fluctuating concentrations of the gaseous components. Catalytic oxidation is a more energy efficient and economical way of destroying VOCs in air intake systems. Catalytic oxidation operates at significantly lower temperatures and requires smaller reactors made of less expensive materials.

Methods for the catalytic oxidation of VOCs are well known in the art. For example, U.S. Pat. Nos. 3,972,979 and 4,053,557, incorporated herein by reference, describe the decomposition of halogenated hydrocarbons by oxidation over chromium oxide or a boehmite supported platinum.

U.S. Pat. Nos. 4,059,675, 4,059,676 and 4,059,683, incorporated herein by reference, describe methods for decomposing halogenated organic compounds using catalysts containing ruthenium, ruthenium-platinum and platinum, respectively, in the presence of an oxidizing agent at a temperature of at least 350° C.

U.S. Pat. No. 5,283,041, incorporated herein by reference, discloses an oxidation catalyst for treating a gas stream containing compounds selected from the group consisting of halogenated organic compounds, other organic compounds and mixtures thereof; the catalyst comprising a core material comprising zirconium oxide and one or more oxides of manganese, cerium or cobalt with vanadium oxide and, preferably, platinum group metal dispersed on the core material.

U.S. Pat. No. 5,643,545, incorporated herein by reference, relates to treatment of streams containing halogenated organic compounds and volatile organic compounds (VOCs) with catalytic materials deposited on high acidity and/or low acidity supports.

U.S. Pat. Nos. 5,578,283 and 5,653,949, incorporated herein by reference, relate to treatment of gases containing halogenated organic compounds, non-halogenated organic compounds, carbon monoxide or mixtures thereof. Catalyst compositions useful in the treatment comprise at least one platinum group metal, zirconium oxide and at least one oxide of manganese, cerium or cobalt. A further composition disclosed uses the foregoing described components but which is substantially free of vanadium in a process for treating a gas stream containing at least one brominated organic compound.

U.S. Pat. No. 6,319,484, incorporated herein by reference, discloses a composition for abatement of airborne pollution by volatile organic compounds ("VOCs"), having an upstream composition containing a protective adsorbent, e.g., Y zeolite, which is effective for adsorbing large VOC molecules. The downstream composition contains a second adsorbent, e.g., a silver-containing ZSM-5, which is effective for adsorbing relatively smaller VOC molecules, e.g., propylene, and a second oxidation catalyst intimately intermingled therewith. Oxidation of VOCs while they are still retained on the adsorbents is promoted at temperatures lower than would be required if the VOCs were desorbed into the gaseous phase.

However, all of the ozone and VOC converters have limitations. Specifically, they have relatively short useful life spans. Currently, aircraft original equipment manufacturers look to regenerate or replace converters every 4,000 to 15,000 flight miles in some applications. Extending the life of these converters could result in significant savings. The short life spans of currently used catalysts result from premature poisoning of the catalysts by inorganic species of zinc, phosphorus, calcium, and other elements, which may leak into the air stream from the lube oil additives used in the engine and/or compressor.

Therefore, it is an object of the present invention to provide an apparatus for improved purification of air, particularly aircraft cabin air. It is another objective of the present invention to provide a means of removing inorganic compounds and particulate matter from inlet gas streams, thereby preventing catalytic poisoning, and thereby extending the life of the catalysts.

SUMMARY OF THE INVENTION

The present invention is directed to an apparatus for the abatement of volatile organic compounds (VOCs) and ozone from aircraft cabin air. More specifically, the apparatus comprises an upstream metallic foam trap and a downstream converter for abating VOCs and/or ozone. The upstream metallic foam trap of the present invention preferentially collects poisonous species, e.g. inorganic deposits from engine or compressor lube oils, primarily in gaseous phase and serves as a physical barrier to the downstream catalysts.

The present invention is also directed to a method for the abatement of ozone and VOCs. The method comprising providing an apparatus comprising an air purification system containing an upstream metallic foam trap and a downstream converter for the abatement of VOCs and/or ozone, and directing an inlet air stream through said apparatus.

A further aspect of the present invention relates to a metallic foam trap having a metallic layer deposited thereon by thermal arc spraying, thereby improving trapping efficiency. Optionally a refractory oxide material is coated on the metallic thermal arc sprayed layer to again improve trapping efficiency. The thermal arc sprayed layer in such application is an intermetallic layer or anchor layer and holds the refractory oxide layer in place.

Other objectives and advantages of the present invention will become apparent from the following description and appended claims.

DETAILED DESCRIPTION OF THE INVENTION

The present invention is directed to an apparatus for improving cabin air quality, particularly in an aircraft, by reducing the presence of volatile organic compounds (VOCS) and/or ozone. More specifically, the present invention is directed to an apparatus comprising of an air purification system containing an upstream metallic foam trap, which preferentially collects poisonous species, such as those found in lube oil additives, primarily in gaseous phase and serves as a physical barrier to the catalysts of a separate downstream converter for the abatement of VOCs and/or ozone. In an embodiment of the present invention, the metallic foam trap and the converter can be fused together by welding, diffusion bonding or other means to constitute a single air purification unit. In another embodiment the converter is a dual-function converter for the abatement of both VOCs and/or ozone.

Figure 1:
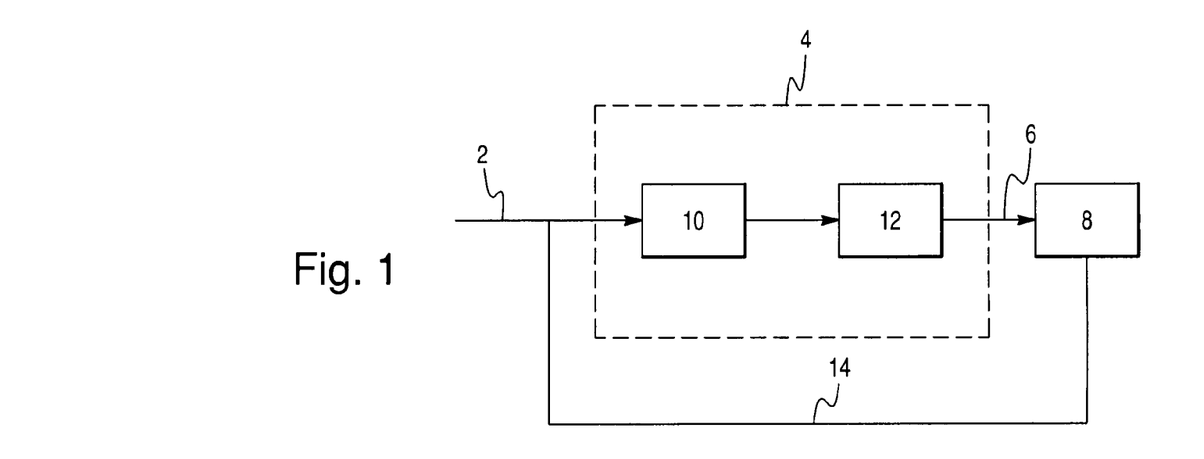
FIG. 1 is a schematic of an apparatus for the abatement of ozone and/or volatile organic compounds in accordance with one embodiment of the present invention.

The apparatus of the present invention may be more readily appreciated by reference to FIG. 1, which depicts in general terms a schematic drawing of one non-limiting embodiment of the invention. Referring to FIG. 1, the apparatus comprises an air inlet 2, an air purification system 4, and an air outlet 6, which can be employed in an aircraft for the abatement of ozone and/or volatile organic compounds (VOCs), from recirculated aircraft cabin air and/or from compressed air received from a compressor contained within the aircraft. The apparatus receives ambient air and/or compressed air from a compressor contained within the aircraft, which needs to be purified by abatement of ozone and VOCs, through the air inlet 2 and expels the purified air through the air outlet 6 into the cabin of an aircraft 8. In turn, aircraft cabin air can be recirculated back to the apparatus through air passage tube 14. The air purification system comprises an upstream metallic foam trap 10 and a downstream converter 12 containing one or more catalysts useful for the break down of ozone and VOCs. As discussed in further detail below, the upstream metallic foam trap 10, comprises an open network of metallic cells or pores consisting of struts for the cellular walls, which preferentially collects poisonous species primarily in gaseous phase and serves as a physical barrier to the downstream converter, see FIGS. 2a and 2b.

The present invention is also directed to a method of improving aircraft cabin air quality, wherein the method provides an apparatus comprising an air purification system containing an upstream metallic foam trap, which preferentially collects poisonous species, such as those found in lube oil additives, primarily in gaseous phase and serves as a physical barrier to the catalysts of a separate downstream converter for the abatement of VOCs and/or ozone, and directing an inlet air stream through said apparatus. In an embodiment of the present invention, the metallic foam trap and the converter can be fused together by welding, diffusion bonding or other means to constitute a single air purification unit. In another embodiment the converter is a dual-function converter for the abatement of both VOCs and ozone.

As used herein and in the appended claims, the terms "upstream" and "downstream" refer to relative directions according to the flow of an aircraft air inlet stream, which typically contains high levels of ozone and may contain volatile organic compounds (VOCs). The term "stream," as used in this specification and appended claims, broadly refers to any combination of flowing gas that may contain solid or liquid particulate matter.

The downstream converter of the instant invention may be used in any configuration, shape or size, which exposes it to the gas to be treated. For example, the catalyst can be conveniently employed in particulate form or the catalyst can be deposited onto a solid monolithic carrier. When the particulate form is desired, the catalyst can be formed into shapes such as tablets, pellets, granules, rings, spheres, etc. The particulate form is especially desirable where large volumes of catalysts are needed, and for use in circumstances in which frequent replacement of the catalyst may be desired. In circumstances in which less mass is desirable or in which movement or agitation of particles of catalyst may result in attrition, dusting and resulting loss of dispersed metals or oxides or undue increase in pressure drop across the particles due to high gas flows, a monolithic form is preferred.

In the employment of a monolithic form, it is usually most convenient to employ the catalyst as a thin film or coating deposited on an inert carrier material which provides the structural support for the catalyst. The inert carrier material can be any refractory material such as ceramic or metallic materials. It is desirable that the carrier material be unreactive with the catalytic components and not be degraded by the gas to which it is exposed. Examples of suitable ceramic materials include sillimanite, petalite, cordierite, mullite, zircon, zircon mullite, spodumene, alumina-titanate, etc. Additionally, metallic materials, which are within the scope of this invention include metals and alloys as disclosed in U.S. Pat. No. 3,920,583, incorporated herein by reference, which are oxidation resistant and are otherwise capable of withstanding high temperatures. For the treatment of gases containing halocarbons, ceramic materials may be preferred.

The monolithic carrier material can best be utilized in any rigid unitary configuration, which provides a plurality of pores or channels extending in the direction of gas flow. In one embodiment the configuration can be a honeycomb configuration. The honeycomb structure can be used advantageously in either unitary form, or as an arrangement of multiple modules. The honeycomb structure is usually oriented such that gas flow is generally in the same direction as the cells or channels of the honeycomb structure. For a more detailed discussion of monolithic structures, refer to U.S. Pat. Nos. 3,785,998 and 3,767,453, which are incorporated herein by reference.

If particulate form is desired, the catalyst can be formed into granules, spheres or extrudates by means well known in the industry. For example, the catalyst powder can be combined with a binder such as a clay and rolled in a disk pelletizing apparatus to give catalyst spheres. The amount of binder can vary considerably but for convenience is present from about 10 to about 30 weight %.

If a monolithic form is desired, the catalyst of this invention can be deposited onto the monolithic honeycomb carrier by conventional means. For example, a slurry can be prepared by means known in the art such as combining the appropriate amounts of the catalyst of this invention in powder form, with water. The resultant slurry is ball-milled for about 8 to 18 hours to form a usable slurry. Other types of mills such as impact mills can be used to reduce the milling time to about 1-4 hours. This slurry can now be used to deposit a thin film or coating of catalyst of this invention onto the monolithic carrier by means well known in the art. Optionally, an adhesion aid such as alumina, silica, zirconium silicate, aluminum silicates or zirconium acetate can be added in the form of an aqueous slurry or solution. A common method involves dipping the monolithic carrier into said slurry, blowing out the excess slurry, drying and calcining in air at a temperature of about 450° C. to about 600° C. for about 1 to about 4 hours. This procedure can be repeated until the desired amount of catalyst of this invention is deposited on said monolithic honeycomb carrier. It is desirable that the catalyst of this invention be present on the monolithic carrier in an amount in the range of about 1-4 g of catalyst per $in^3$ of carrier volume and preferably from about 1.5-3 $g/in^3$.

The downstream ozone abatement catalysts useful for the practice of the present invention can be any ozone abatement catalyst system known in the art. For example, the ozone abatement catalysts of U.S. Pat. Nos. 4,343,776; 4,206,083; 4,900,712; 5,080,882; 5,187,137; 5,250,489; 5,422,331;

5,620,672; 6,214,303; 6,340,066; and 6,616,903, which are hereby incorporated by reference, are useful for the practice of the present invention.

An illustrative example is U.S. Pat. No. 6,616,903, which discloses a useful ozone treating catalyst comprises at least one precious metal component, preferably a palladium component dispersed on a suitable support such as a refractory oxide support. The composition comprises from 0.1 to 20.0 weight %, and preferably 0.5 to 15 weight % of precious metal on the support, such as a refractory oxide support, based on the weight of the precious metal (metal and not oxide) and the support. Palladium is preferably used in amounts of from 2 to 15, more preferably 5 to 15 and yet more preferably 8 to 12 weight %. Platinum is preferably used at 0.1 to 10, more preferably 0.1 to 5.0, and yet more preferably 2 to 5 weight %. Palladium is most preferred to catalyze the reaction of ozone to form oxygen. The support materials can be selected from the group recited above. In one embodiment, there can additionally be a bulk manganese component, or a manganese component dispersed on the same or different refractory oxide support as the precious metal, preferably palladium component. There can be up to 80, preferably up to 50, more preferably from 1 to 40 and yet more preferably 5 to 35 weight % of a manganese component based on the weight of palladium and manganese metal in the pollutant treating composition. Stated another way, there is preferably about 2 to 30 and preferably 2 to 10 weight % of a manganese component. The catalyst loading is from 20 to 250 grams and preferably about 50 to 250 grams of palladium per cubic foot (g/ft$^3$) of catalyst volume. The catalyst volume is the total volume of the finished catalyst composition and therefore includes the total volume of air conditioner condenser or radiator including void spaces provided by the gas flow passages. Generally, the higher loading of palladium results in a greater ozone conversion, i.e., a greater percentage of ozone decomposition in the treated air stream.

Another illustrative example from U.S. Pat. No. 6,616,903, comprises a catalyst compositions to treat ozone comprising a manganese dioxide component and precious metal components such as platinum group metal components. While both components are catalytically active, the manganese dioxide can also support the precious metal component. The platinum group metal component preferably is a palladium and/or platinum component. The amount of platinum group metal compound preferably ranges from about 0.1 to about 10 weight % (based on the weight of the platinum group metal) of the composition. Preferably, where platinum is present it is in amounts of from 0.1 to 5 weight %, with useful and preferred amounts on pollutant treating catalyst volume, based on the volume of the supporting article, ranging from about 0.5 to about 70 g/ft$^3$. The amount of palladium component preferably ranges from about 2 to about 10 weight % of the composition, with useful and preferred amounts on pollutant treating catalyst volume ranging from about 10 to about 250 g/ft$^3$.

Ozone abatement catalysts, especially those containing a palladium catalytic component, are effective at temperatures as low as about 100° F. (37.7° C.), although the rate of ozone abatement is increased if the air or other gas stream being treated is heated to a higher temperature. Nonetheless, in some applications it is highly desirable to have the catalyst composition be effective over a broad range of inlet gas temperatures, on the order of about 100° to 300° F. (21.1° to 148.9° C.). For effective low temperature operation it is desirable that a high density of the noble catalytic metal, such as palladium, be attained in highly dispersed form on the refractory metal oxide support. It has been found that the desired high density of palladium catalytic component is enhanced if the soluble palladium salt used to impregnate the overlayer refractory metal oxide particles is a solution of a palladium amine salt, such as palladium tetraamine hydroxide or palladium tetraamine acetate, or palladium nitrate. The use of such salts, especially in combination with a high porosity refractory metal oxide support as described below is found to give higher densities of palladium with improved dispersion on the overlayer refractory metal oxide than that attainable under similar conditions with other palladium salts, such as palladium acetate or palladium chloride. Of course, as noted above, palladium chloride is preferably not used in any case in order to render the catalyst composition a non-chloride composition and thereby ameliorate or prevent corrosion of metal substrates on which the catalyst composition is carried.

The downstream volatile organic compound (VOC) abatement catalysts useful for the practice of the present invention can be any VOC abatement catalyst system known in the art. For example, the VOC abatement systems of U.S. Pat. Nos. 3,972,979; 4,053,557, 4,059,675; 4,059,676; 4,059,683; 5,283,041, 5,643,545; 5,578,283; 5,653,949; and 6,319,484, which are hereby incorporated by reference, are useful for the practice of the present invention. The abatement composition adsorbs and/or oxidizes volatile organic compounds, such as hydrocarbons, aldehydes, ketones, etc., in alternating adsorption and oxidation temperature ranges which lie within a low to moderate operating temperature range.

In an illustrative example is U.S. Pat. No. 6,616,903, which discloses a catalyst composition to treat volatile organic compounds (VOCs), can comprise from 0.01 weight % to 20 weight % and preferably 0.5 weight % to 15 weight % of the precious metal component on a suitable support such as a refractory oxide support, with the amount of precious metal being based on the weight of the precious metal, (not the metal component) and the support. Platinum is the most preferred and is preferably used in amounts of from 0.01 weight % to 10 weight % and more preferably 0.1 weight % to 5 weight % and most preferably 1.0 weight % to 5 weight %. When loaded onto a monolithic structure the catalyst loading is preferably about 1 to 150, and more preferably 10 to 100 grams of platinum per cubic foot (g/ft$^3$) of catalyst volume. The preferred refractory oxide support is a metal oxide refractory which is preferably selected from ceria, silica, zirconia, alumina, titania and mixtures thereof with alumina and titania being most preferred.

Another illustrative example is U.S. Pat. No. 5,653,949, which discloses a catalyst comprising one or more platinum group metals, zirconium oxide and at least one of manganese oxide, cerium oxide or cobalt oxide. Typically, the catalysts contain from about 40 up to about 88 weight % zirconium oxide (as $ZrO_2$), preferably from about 60 up to about 85 weight %; and from about 3 up to about 48 weight % of one or more oxides of manganese, cerium or cobalt, preferably about 10 up to about 30 weight percent. The platinum group metals may be platinum, palladium and rhodium and the platinum group metal may be present in the catalyst in an amount of from about 0.01 to about 8 weight % of the catalyst, and particularly in an amount of at least about 0.1 weight %.

In one embodiment the downstream ozone and/or VOC abatement catalyst is a catalyst composition comprising a catalytic material coated on a substrate, in which the catalytic material comprises an undercoat layer or a fine particulate refractory metal oxide and an overlayer or a refractory metal oxide support on which is dispersed at least one catalytic metal component.

Generally, any suitable substrate material may be employed, including cordierite or other ceramic-like materials, as well as suitable metals. Typically, the metal substrates have substantially thinner walls than cordierite or other ceramic-like substrates and yet provide adequate mechanical strength and better resistance to thermal shock than do cordierite or similar substrates, and to that extent are preferred. The thinner walls of metal substrates as compared to cordierite substrates assist in reducing the pressure drop sustained by a gas forced through the substrate.

For abatement catalysts intended for use in aircraft, it is particularly important that the catalyst be as low weight as possible. It has been found that a highly satisfactory catalyst of lightweight can be made in accordance with the teachings of the present invention by utilizing a metal substrate in which the metal is aluminum or an aluminum alloy such as an aluminum-magnesium alloy. Alternatively, the metal substrate may be made of titanium or a titanium alloy. However, aluminum is lighter than titanium, less expensive and easier to weld or braze in order to form a satisfactory metal substrate. Accordingly, metal substrates made of aluminum or aluminum alloys are, to that degree, preferred. In particular, an aluminum-magnesium alloy provides greater hardness, strength and corrosion resistance than aluminum, but cannot readily be brazed due to the magnesium content. Accordingly, aluminum-magnesium alloy metal substrates would have to rely on pins or other mechanical fasteners to provide a rigid metal substrate structure.

In one embodiment, the catalysts may comprise a dual-function catalyst for both the reduction of ozone and the removal and/or oxidation of volatile organic compounds (VOCs). In yet another embodiment, the dual-function catalyst comprises separate catalytic chambers, one consisting of a catalyst for the reduction of ozone and the second for the removal and/or oxidation of volatile organic compounds (VOCs).

Figure 2A:
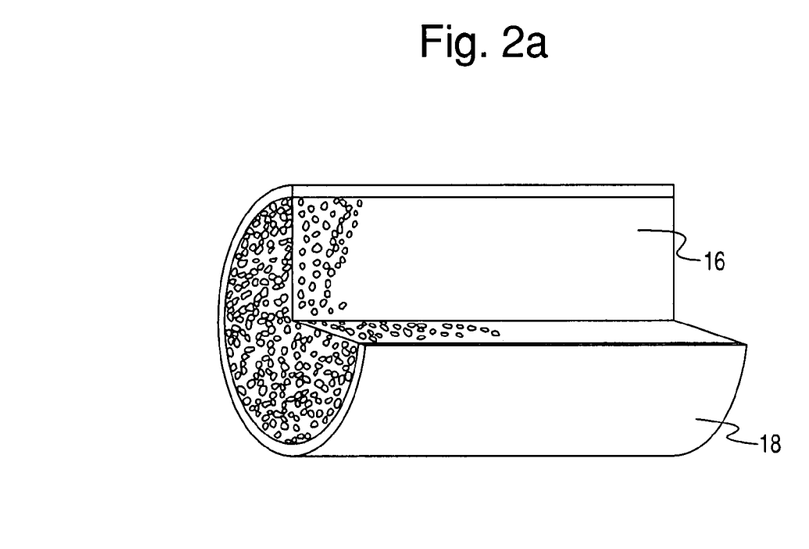
FIG. 2a is a pictorial sectional view illustrating the general configuration of a metallic foam trap in accordance with one embodiment of the present invention.
Figure 2B:
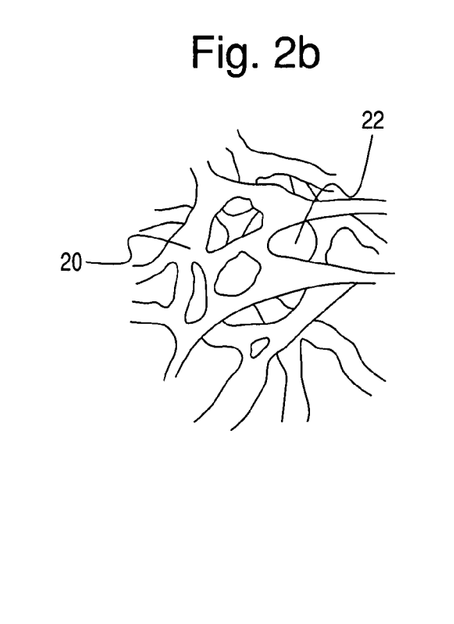
FIG. 2b is an enlarged schematic fragmental view of the three-dimensional network of the metallic foam trap.

The metallic foam trap of the present invention forms an open or reticulated substrate structure comprising metallic cells or pores consisting of struts for the cellular walls, see FIG. 2b. The metallic foam substrate can be further described as a porous matrix having a plurality of irregularly shaped passages wherein exhaust gases undergo multiple random twists and turns in traveling from the upstream side to the downstream side of the trap, see FIG. 2a. This turbulent or tortuous flow path is defined by numerous apertures, pores, channels or similar structural features that cause liquid and/or gas to flow therethrough in turbulent or substantially non-laminar fashion and give the substrate a high surface area per overall volume of the flow path of the fluid through the substrate, e.g., features that create a high mass transfer zone for the fluid therein. In contrast, a dense substrate, such as a plate, tube, foil and the like, has a relatively small surface area per overall volume of the flow path through the substrate regardless of whether it is perforated or not, and do not substantially disrupt laminar flow therethrough. The open or reticulated substrate structure of the metallic foam, importantly not only provides a high mass transfer zone, but such open structure keeps backpressure low.

The metallic foam trap of the present invention may be more readily appreciated by reference again to FIG. 2a, which depicts a schematic perspective view of a metallic foam trap, and FIG. 2b, which depicts an enlarged schematic fragmental view of the three-dimensional network of the metallic foam trap, both intended as non-limiting embodiments of the invention. Referring to FIGS. 2a and b, a metallic foam trap 16 is housed within a housing unit 18. The schematic shows an open network of metallic struts 20 and pores 22, which makes up a torturous pathway for an air inlet stream. The metallic foam preferentially collects poisonous species primarily in the gaseous phase and serves as a physical barrier to prevent poisonous species from contacting the downstream converter catalysts.

Since these metallic foam structures have higher surface areas than dense substrates and since they permit fluid flow therethrough, they are well-suited for use in preparing trap members for the trapping of liquid-or gas-borne materials. Furthermore, the high surface area provides for improved mass transfer of active species thereby improving the efficiency of the metallic foam trap.

Methods for making foamed metal are known in the art, see e.g., U.S. Pat. No. 3,111,396, which is incorporated herein by reference, and the use of foamed metal as a carrier for a catalytic material has been suggested in the art, see e.g., SAE Technical Paper 971032, entitled "A New Catalyst Support Structure For Automotive Catalytic Converters" by Arums D. Jatkar, which was presented at the International Congress and Exposition, Detroit, Michigan, Feb. 24-27, 1997, and Pestryakov et al., Journal of Advanced Materials, 1(5), 471-476 (1994). Metallic foams can be characterized in various ways, some of which relate to the properties of the initial organic matrix about which the metal is disposed. Some characteristics of foamed metal substrates recognized in the art include cell size, density, free volume, and specific surface area. For example, the surface area may be 1500 times that of a solid substrate having the same dimensions as the foamed substrate. As mentioned by Pestryakov et al, foamed metal substrates useful as carriers for catalyst members may have mean cell diameters in the range of 0.5 to 5 mm, and they may have a free volume of from about 80 to 98%, e.g., 3 to 15 percent of the volume occupied by the foamed substrate may constitute metal. The porosity of the substrate may range from 3 to 80 pores per inch (ppi), e.g., from 3 to 30 ppi, or from 3 to 10 ppi, or from 3 to 5 ppi. In an illustrative range of 10 to 80 ppi, other characteristics such as cells per square inch may range from 100 to 6400 and the approximate web diameter may vary from 0.01 inch to 0.004 inch. Such foams may have open-cell reticulated structures, based on a reticulated/interconnected web precursor. They typically have surface areas that increase with porosity in the range of from about 700 square meters per cubic foot of foam ($m^2/ft^3$) at about 10 ppi to 4000 $m^2/ft^3$ at about 60 ppi, etc. Other suitable metallic foamed substrates have surface areas ranging from about 200 square feet per cubic foot of foamed metal ($ft^2/ft^3$) at about 10 ppi to about 1900 $ft^2/ft^3$ at about 80 ppi. One such substrate has a specific weight of 500 g/m at a thickness of about 1.6+/−0.2 millimeters with a porosity of 110 ppi. They may have volume densities in the range of 0.1 to 1 grams per cubic centimeter (g/cc), 0.1 to 0.3 g/cc is also exemplified.

Metallic foamed substrates can be formed from a variety of metals, including iron, titanium, tantalum, tungsten noble metals, common sinterable metals such as copper, nickel, bronze, etc., aluminum, zirconium, etc., and combinations and alloys thereof such as titanium aluminum alloys, steel, stainless steel, Hastalloy, Ni/Cr, Inconel (nickel/chromium/iron), Monel (nickel/copper), and Fecralloy (iron/chromium/aluminum/yttrium). In one embodiment, the metallic foam substrate is selected from the group consisting of stainless steel, copper, titanium, Fecralloy, aluminum zirconate, aluminum titanate, aluminum phosphate, cordierite, mullite and corundum. For use in aircraft, it is particularly important that the metallic foam be as low weight as possible, thus, metallic foam substrates comprising aluminum, copper, titanium, or alloys thereof, e.g., titanium aluminum alloys, are exemplified. Copper may be useful because copper is considered to be very reactive with ozone. For example, the copper metallic foam support can be pretreated to create an in situ high surface area copper oxide on the surface of the substrate, which may be useful for the treatment or removal of ozone from an air intake stream. A suitable metallic foam substrate for use with the present invention has a volume occupied by the foamed substrate of about 3 percent to about 10 percent. From about 6 to about 8 percent is also exemplified.

The metallic foam substrate is preferably coated with a high-surface area component, said component comprising a pre-treatment metallic thermal arc sprayed layer and optionally a washcoat layer, such as aluminum oxide, cerium oxide, zirconium oxide and copper oxide. The metallic thermal arc sprayed layer coating can be useful to facilitate the adhesion of the washcoat layer. The metallic thermal arc sprayed layer of the present invention can be applied with a thermal spraying process in general, including plasma spraying, single wire plasma spraying, high velocity oxy-fuel spraying, combustion wire and/or powder spraying, electric arc spraying, etc.

In one aspect of the present invention, electric arc spraying, e.g., twin wire arc spraying, of a metal (which term, as used herein and in the claims, includes mixtures of metals, including without limitation, metal alloys, pseudoalloys, and other intermetallic combinations) onto metallic foam substrate yields a structure having unexpectedly superior utility as a substrate for a washcoat layer, e.g., a refractory metal oxide. Twin wire arc spraying (encompassed herein by the term "wire arc spraying" and by the broader term "electric arc spraying") is a known process, see e.g., U.S. Pat. No. 4,027,367, which is incorporated herein by reference. Briefly described, in the twin wire arc spray process, two feedstock wires act as two consumable electrodes. These wires are insulated from each other as they are fed to the spray nozzle of a spray gun in a fashion similar to wire flame guns. The wires meet in the center of a gas stream generated in the nozzle. An electric arc is initiated between the wires, and the current flowing through the wires causes their tips to melt. A compressed atomizing gas, usually air, is directed through the nozzle and across the arc zone, shearing off the molten droplets to form a spray that is propelled onto the substrate. Only metal wire feedstock can be used in an arc spray system because the feedstock must be conductive. The high particle temperatures created by the spray gun produce minute weld zones at the impact point on a metallic substrate. As a result, such electric arc spray coatings (sometimes referred to herein as "anchor layers") have good cohesive strength and a very good adhesive bond to the substrate.

Thermal arc sprayed layers of a variety of compositions can be deposited on a metallic foam substrate in accordance with the present invention by utilizing, without limitation, feedstocks of the following metals and metal mixtures: Ni, Ni/Al, Ni/Cr, Ni/Cr/Al/Y, Co/Cr, Co/Cr/Al/Y, Co/Ni/Cr/Al/Y, Fe/Al, Fe/Cr, Fe/Cr/Al, Fe/Cr/Al/Y, Fe/Ni/Al, Fe/Ni/Cr, 300 and 400 series stainless steels, and, optionally, mixtures of one or more thereof. Again, it is particularly important for aircraft applications that the metallic foam trap of the invention be light weight. In one embodiment, the metallic thermal arc sprayed layer may comprise nickel and aluminum. The aluminum may comprise from about 3 to 10 percent, optionally from about 6 to 8 percent, of the combined weight of nickel and aluminum in the metallic thermal arc sprayed layer.

In one embodiment of the present invention, a high surface area temperature resistant refractory layer can be coated onto a metallic thermal arc sprayed layer. Useful high surface area refractory layers include one or more refractory oxides. These oxides include, for example, silica and metal oxides such as alumina, including mixed oxide forms such as silica-alumina, aluminosilicates which may be amorphous or crystalline, alumina-zirconia, alumina-chromia, alumina-ceria and the like. In another embodiment, the support may be substantially comprised of alumina which preferably includes the members of the gamma or activated alumina family, such as gamma and eta aluminas, and, if present, a minor amount of other refractory oxide, e.g., about up to 20 weight percent. Desirably, the active alumina has a specific surface area of 30 to 300 m$^2$/g.

Other suitable materials for the refractory metal oxide layer include copper, alumina, silica, titania, titania-alumina, silica-alumina, alumino-silicates, zirconia, titania-zirconia, aluminum-zirconium oxide, aluminum-chromium oxide, baria-alumina, etc. Such materials are preferably used in their high surface area forms. For example, gamma-alumina is preferred over alpha-alumina. Alternatively, the refractory layer may be made of any suitable refractory materials such as cordierite, cordierite-alpha-alumina, silicon nitride, zirconium mullite, spodumene, alumina-silica magnesia, zirconium silicate, sillimanite, magnesium silicates, zirconium oxide, petallite, alpha-alumina and alumino-silicates. In one embodiment of the present invention the refractory layer may be selected from the group consisting of refractory oxides such as alumina, titania, zirconia, zirconia-alumina, zirconia-titania, titania-alumina, lanthana-alumina, baria-zirconia-alumina, niobia-alumina, and silica-leached cordierite.

The refractory metal oxide layer is preferably porous in nature and has a high surface area such as alumina, preferably gamma-alumina. The choice of the support material is not critical to the invention. Desirably, the refractory metal oxide support will have a surface area of between about 5 and about 350 m$^2$/g. Typically, the support will be present in the amount of about 1.5 to about 5.0 g/in$^3$, preferably 2 to 4 g/in$^3$.

In yet another embodiment, the metallic foam trap of the invention contains at least one perforated skewed channel therethrough to relieve backpressure. The perforated skewed channel(s) can be literally drilled directly through the metallic foam at an angle thereby allowing the air inlet stream to mix between the outer and inner confines passing through the pipe, without compromising the efficiency of the metallic foam trap. This open structure through the metallic foam relieves air inlet stream backpressure.

Figure 3:
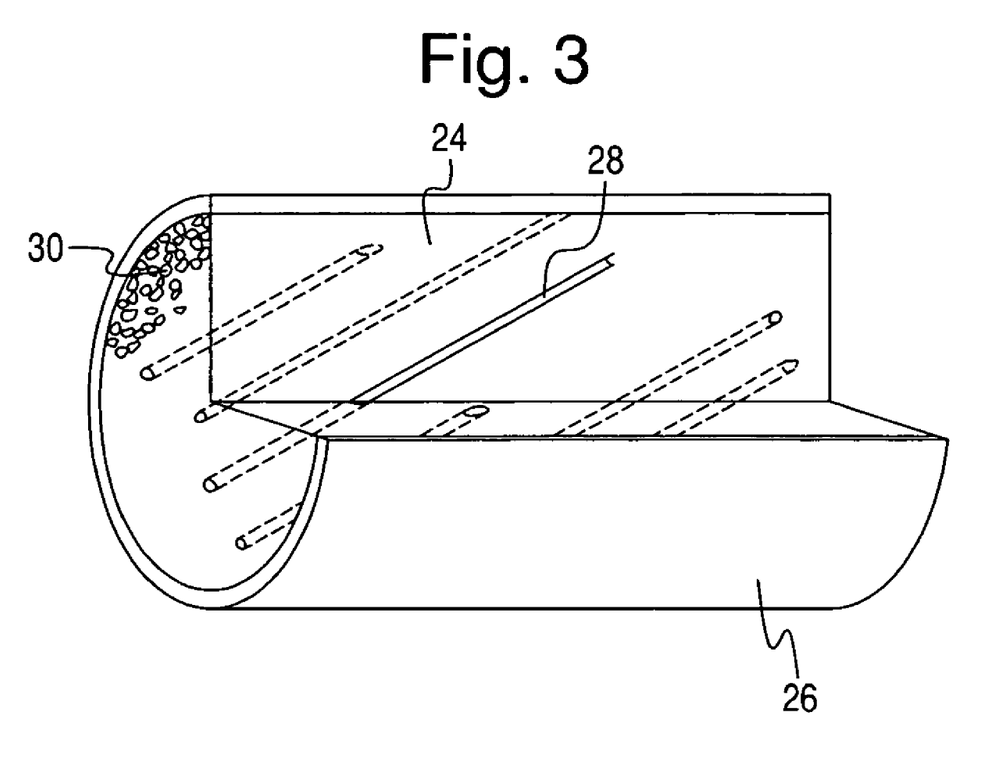
FIG. 3 is a pictorial sectional view of an alternative configuration of a metallic foam trap, in accordance with an embodiment of the present invention.

The metallic foam trap of this embodiment of the present invention may be more readily appreciated by reference to FIG. 3, which depicts a schematic perspective view of a metallic foam trap. Referring to FIG. 3, the metallic foam trap 24 is housed within a housing unit 26 and contains a plurality of perforated skewed channels 28 running therethrough. The perforated skewed channels 28 run at an angle relative to the longitudinal axis of trap 24 thereby allowing the air inlet stream to mix between the outer and inner confines passing through the pipe, without compromising the efficiency of the metallic foam trap. Channels 28 do not alter in any significant manner the tortuous pathway created by the metallic foam. The perforated skewed channels 28 relieve backpressure. As seen in FIG. 3, the metallic foam comprises an open network of pores 30 which along with the metallic struts (not shown), which form a tortuous pathway for an air inlet stream as described above. The struts can be coated with a metallic thermal arc sprayed layer and optionally a high surface area temperature resistant metal oxide, which preferentially collects poisonous species primarily in the gaseous phase and serves as a physical barrier to the catalysts of a separate downstream converter for the abatement of VOCs and/or ozone.

Although catalysts are generally ill-suited for use with gases containing inorganic compounds and/or unused hydrocarbons (as described above), a catalyst may optionally be employed on the metallic foam. The catalyst may be any known catalyst for the reduction of volatile organic compounds (VOCs) and/or ozone from an air stream, as discussed hereinabove. In one embodiment, the catalyst may be employed in the downstream half of the metallic foam trap to prevent substantial poisoning thereof.

What is claimed is:

1. In an air recirculation system for redirecting purified air into an aircraft cabin comprising an inlet, an air purification system, and an air outlet for redirecting said purified air into said aircraft cabin, said air purification system further comprising: (a) an upstream metallic foam trap; and (b) a downstream converter, said converter comprising one or more catalysts for abatement of ozone and/or volatile organic compounds.

2. The apparatus of claim 1, wherein said metallic foam is selected from the group consisting of stainless steel, copper, titanium, Fecralloy, aluminum zirconate, aluminum titanate, aluminum phosphate, cordierite, mullite and corundum.

3. The apparatus of claim 1, wherein said metallic foam trap is an aluminum, copper, titanium, or titanium aluminum alloy comprising trap.

4. The apparatus of claim 1, wherein said metallic foam trap is coated with a metallic thermal arc sprayed layer.

5. The apparatus of claim 4, wherein said metallic thermal arc sprayed layer is selected from the group consisting of Ni, Ni/Al, Ni/Cr, Ni/Cr/Al/Y, Co/Cr, Co/Cr/Al/Y, Co/Ni/Cr/Al/Y, Fe/Al, Fe/Cr, Fe/Cr/Al, Fe/Cr/Al/Y, Fe/Ni/Al, Fe/Ni/Cr, 300 and 400 series stainless steels.

6. The apparatus of claim 4, wherein said metallic foam is coated with said metallic thermal arc sprayed layer and a refractory oxide layer.

7. The apparatus of claim 6, wherein said refractory oxide layer includes one or more refractory oxides selected from the group consisting of copper, alumina, gamma-alumina, titania, zirconia, zirconia-alumina, zirconia-titania, titania-alumina, lanthana-alumina, baria-zirconia-alumina, niobia-alumina, and silica-leached cordierite.

8. The apparatus of claim 1, wherein said converter comprising one or more catalysts is a dual-function converter for the abatement of volatile organic compounds and ozone.

9. A method for the abatement of ozone and volatile organic compounds from aircraft cabin air, said method comprising: (a) receiving an inlet air stream from an aircraft, (b) directing said inlet air stream through: (i) an upstream metallic foam trap; and (ii) a downstream converter for abatement of ozone and/or volatile organic compounds; and (c) recirculating said air stream from said downstream converter to said aircraft cabin.

10. The method of claim 9, wherein said metallic foam is selected from the group consisting of stainless steel, copper, titanium, Fecralloy, aluminum zirconate, aluminum titanate, aluminum phosphate, cordierite, mullite and corundum.

11. The method of claim 9, wherein said metallic foam trap in an aluminum, copper, titanium, or titanium aluminum alloy comprising trap.

12. The method of claim 9, wherein said metallic foam trap is coated with a metallic thermal arc sprayed layer.

13. The method of claim 12, wherein said metallic thermal arc sprayed layer is selected from the group consisting of Ni, Ni/Al, Ni/Cr, Ni/Cr/Al/Y, Co/Cr, Co/Cr/Al/Y, Co/Ni/Cr/Al/Y, Fe/Al, Fe/Cr, Fe/Cr/Al, Fe/Cr/Al/Y, Fe/Ni/Al, Fe/Ni/Cr, 300 and 400 series stainless steels.

14. The method of claim 12, wherein said metallic foam is coated with said metallic thermal arc sprayed layer and a refractory oxide layer.

15. The method of claim 14, wherein said refractory oxide layer includes one or more refractory oxides selected from the group consisting of copper, alumina, gamma-alumina, titania, zirconia, zirconia-alumina, zirconia-titania, titania-alumina, lanthana-alumina, baria-zirconia-alumina, niobia-alumina, and silica-leached cordierite.

16. The apparatus of claim 9, wherein said conversion catalyst is a dual-function catalyst for the abatement of volatile organic compounds and ozone.

17. In an air recirculation system for redirecting purified air into an aircraft cabin comprising an inlet, an air purification system, and an air outlet for redirecting said purified air into said aircraft cabin, said air purification system further comprising: (a) an upstream metallic foam trap said foam trap containing at least one perforated skewed channel therethrough; and (b) a downstream converter, said converter comprising one or more catalysts for abatement of ozone and/or volatile organic compounds.

18. The apparatus of claim 17, wherein said metallic foam is selected from the group consisting of stainless steel, copper, titanium, Fecralloy, aluminum zirconate, aluminum titanate, aluminum phosphate, cordierite, mullite and corundum.

19. The apparatus of claim 17, wherein said metallic foam trap is coated with a metallic thermal arc sprayed layer.

20. The apparatus of claim 19, wherein said metallic thermal arc sprayed layer is selected from the group consisting of Ni, Ni/Al, Ni/Cr, Ni/Cr/Al/Y, Co/Cr, Co/Cr/Al/Y, Co/Ni/Cr/Al/Y, Fe/Al, Fe/Cr, Fe/Cr/Al, Fe/Cr/Al/Y, Fe/Ni/Al, Fe/Ni/Cr, 300 and 400 series stainless steels.

* * * * *